United States Patent
Benthien et al.

(10) Patent No.: US 12,027,840 B2
(45) Date of Patent: Jul. 2, 2024

(54) BUSBAR FOR AN AIRCRAFT, METHOD OF MANUFACTURING SUCH BUSBAR, AND AIRCRAFT COMPRISING SUCH BUSBAR

(71) Applicant: Airbus Operations GmbH, Hamburg (DE)

(72) Inventors: Hermann Benthien, Hamburg (DE); Matthias Hegenbart, Hamburg (DE); Peter Linde, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 173 days.

(21) Appl. No.: 17/941,638

(22) Filed: Sep. 9, 2022

(65) Prior Publication Data

US 2023/0083452 A1  Mar. 16, 2023

(30) Foreign Application Priority Data

Sep. 10, 2021 (EP) .................................. 21196119

(51) Int. Cl.
*H02G 5/00* (2006.01)
*B64F 5/10* (2017.01)
*H02G 5/10* (2006.01)

(52) U.S. Cl.
CPC ............. *H02G 5/005* (2013.01); *B64F 5/10* (2017.01); *H02G 5/10* (2013.01); *B64D 2221/00* (2013.01)

(58) Field of Classification Search
None
See application file for complete search history.

(56) References Cited

U.S. PATENT DOCUMENTS

| | | | | |
|---|---|---|---|---|
| 3,609,215 A * | 9/1971 | Giger, Jr. | ............... | H02G 5/007 174/88 B |
| 3,726,988 A * | 4/1973 | Davis | ..................... | H02G 5/06 174/68.2 |
| 5,567,657 A * | 10/1996 | Wojnarowski | ...... | H01L 23/5389 438/109 |
| 6,974,333 B2 * | 12/2005 | Wildes | ................... | H01R 12/62 439/67 |

(Continued)

FOREIGN PATENT DOCUMENTS

EP  3 439 244 B1  2/2019

OTHER PUBLICATIONS

European Search Report for Application No. 21196119 dated Feb. 7, 2022.

*Primary Examiner* — Courtney L Smith
(74) *Attorney, Agent, or Firm* — KDW Firm PLLC

(57) ABSTRACT

A busbar for an aircraft with at least two conductive layers and at least three insulating layers. The conductive layers and the insulating layers are stacked together alternatingly and extend in a longitudinal direction. The conductive layers and the insulating layers include different coefficients of thermal expansion. Each of the conductive layers includes spatial structures. Each spatial structure is connected to an adjacent one by an interconnecting segment. Each conductive layer is embedded between two insulating layers, resulting in a deforming of the side walls of the spatial structures under heat, thereby compensating a longitudinal expansion of the conductive layers. Further, an aircraft with a disclosed busbar and a method of producing such busbar is provided.

14 Claims, 5 Drawing Sheets

(56) References Cited

U.S. PATENT DOCUMENTS

| | | | |
|---|---|---|---|
| 7,819,681 B1* | 10/2010 | Rodrigues | H02G 5/007 |
| | | | 174/88 B |
| 9,159,639 B2* | 10/2015 | Besendörfer | H01L 23/3735 |
| 10,971,948 B2 | 4/2021 | Jacquemond-Collet et al. | |
| 11,189,998 B2* | 11/2021 | Mruczek | H02G 5/005 |
| 2019/0039715 A1 | 2/2019 | Jacquemond-Collet et al. | |
| 2021/0076485 A1* | 3/2021 | Coakley | H05K 1/118 |
| 2023/0402776 A1* | 12/2023 | Coakley | H05K 1/147 |

\* cited by examiner

BUSBAR FOR AN AIRCRAFT, METHOD OF MANUFACTURING SUCH BUSBAR, AND AIRCRAFT COMPRISING SUCH BUSBAR

CROSS-REFERENCE TO RELATED APPLICATION

This application claims priority to Patent Application No. EP 21196119.8 filed Sep. 10, 2021, the entire disclosure of which is incorporated by reference herein.

TECHNICAL FIELD

The present disclosure relates to electrical distribution lines in general, and in particular to busbars for transmitting electrical energy and signals in aircrafts. Furthermore, the description relates to an aircraft with such a busbar and a method for manufacturing a busbar.

BACKGROUND

Aircrafts such as passenger planes are equipped with a plurality of electrical appliances which need to be provided with electrical energy and which are usually spread out over the whole plane. Corresponding power sources may be, for example, generators at the turbines or batteries. As such sources are usually not distributed over the aircraft but are located at certain distinct areas, such as at the turbines or in the rear of the vehicle, it is necessary to provide means for distribution of their electrical energy to the electrical consumers. Further, certain electronics equipment of modern aircrafts is distributed over the vehicle and needs to be enabled to communicate with each other by digital data transmission. In principle, for these purposes, a multitude of arrangements, such as flexible cables or rigid conductor lines are conceivable. However, certain space and temperature requirements need to be met. On the one hand, the power and data lines must not be accessible from within the cabin, in order to protect passengers from electric shocks. Therefore, the conductors must be hidden behind cladding components such as the wall panels or above or behind the storage compartments, leading to very restricted space for the conductors. On the other hand, the conductors need to be prevented from exceeding certain temperature thresholds. Because of the restricted space, flexible cables cannot be used, because these cables tend to swing. Further, flexible cables need to be mounted by retainers, which significantly increases the weight of the plane.

Already for some time now, therefore, aircrafts have been equipped with rigid busbars which comprise multiple conductor lines very close to each other and which can run along the entire longitudinal length of an aircraft. Such busbars can comprise multiple busbar sections which are interconnected with each other.

For example, EP 3 439 244 B1 describes a modular element for a combined electrical power distribution and data communication network of an aircraft. The modular element includes a section of a busbar and a set of data links extending substantially parallel along a length of the modular element. The busbar section has connection points at various locations distributed along its length. The data link assembly includes connection points at different locations distributed along its length, each arranged in proximity to a connection point of the busbar section. It also includes a data link between each of the connection points and a cross-connect point. The busbar section and the data link assembly include interconnection points for connecting the modular element to first and second other modular elements arranged longitudinally in series with the modular element.

Although such busbars are very space-saving, the rigid construction and the long extension leads to the problem that the thermal expansion of the conductors introduces compressive stress loads and tensions into the busbar when it heats up. This drawback may be even worse by the heating up of the busbar by the current flowing through the conductor lines. Also, because of the compact arrangement of the conductors of the busbar, heat dissipation may be more difficult.

For the remedy of the problem of mechanical tensions, certain solutions are currently used in the art, such as busbar elements with flexible sections but with rigid junctions between single busbar elements or fully rigid busbar elements with flexible sliding junctions between them. Sliding junctions may not be suitable for high-voltages, as the junctions may weld together, removing the mechanical relieve functionality. Also, flexible junctions may be difficult to isolate electrically.

SUMMARY

It is an objective of the disclosure herein to provide a busbar for an aircraft that reduces the mechanical stress due to thermal loads and with reduced structural complexity.

This objective is solved by the subject matter herein. Further embodiments are described in the following description.

According to a first aspect, a busbar is provided. The busbar comprises at least two conductive layers and at least three insulating layers. The conductive layers comprise an electrically conductive material and the insulating layers comprise an electrically insulating material. The conductive layers and the insulating layers are stacked together alternatingly and are extending in a longitudinal direction, wherein outer surfaces of the busbar are formed by two of the insulating layers. The electrically insulating material and the electrically conductive material comprise different coefficients of thermal expansion. Each of the conductive layers comprises a plurality of spatial structures, each of which comprises at least two side walls and at least partially surrounds a cavity. Each of the plurality of spatial structures is connected to an adjacent one of the plurality of spatial structures by a interconnecting segment. Each of the conductive layers is embedded between two insulating layers, so that, due to thermal expansion of the busbar resulting from the different coefficients of thermal expansion, the insulating layers exert a force on the conductive layers, resulting in a deforming of the side walls of the spatial structures, thereby compensating a longitudinal expansion of the conductive layers.

The at least two conductive layers of the busbar may be suitable to be used as conductor lines for one or more power sources, for example to conduct a DC or AC voltage, including a high voltage, across an aircraft. For example, one of the conductive layers may be connected to a ground potential or to a negative potential and the other one may be connected to a positive potential of a power source, such as a generator or battery. The busbar can also include more than two conductive layers, for example four or six conductive layers, to enable to distribute different voltages across an aircraft or other vehicle. Uneven numbers of conductive layers, such as one, three, or five are also conceivable, e.g., when one of the layers is used for a common ground potential.

The arrangement of the conductive layers and the insulating layers generally builds a busbar with conductor lines electrically isolated from each other. The conductive layers and the insulating layers have a generally flat structure when viewed from one of the ends of the busbar and extend along the longitudinal direction of the busbar, which is the direction along which electrical currents or signals can be conducted. For example, in an installed state in an aircraft, the busbar (or multiple busbars connected to each other at their ends) extend along the longitudinal direction, i.e., the flight direction, of the aircraft. In this case, the longitudinal direction of the busbar corresponds to the longitudinal direction of the aircraft. The conductive layers and the insulating layers are stacked alternatingly, meaning below a conductive layer, an insulating layer follows and vice versa. The insulating layers isolate the conductive layers from each other.

The conductive layers are essentially rigid layers, which, however, may still allow some deformation, for example by bending.

The conductive layers and the insulating layers are at least punctually fixed together. For example, the insulating layers and the conductive layers may be glued together. The arrangement may, for example, also be created by applying a non-conductive resin or a suitable preform onto the conductive layers and curing the structure afterwards. The different coefficients of thermal expansion of the conductive layers and the insulating layers result in different thermal elongations of the conductive layers and the insulating layers, when the busbar experiences a temperature increase, which can for example happen because of the heat energy created by the conducted current or by externally applied thermal energy, e.g., the sun heating up the fuselage of an aircraft in which the busbar is mounted.

The interconnecting segments connecting the spatial structures of the conductive layer to each other may be regular plate shaped sections of conductive layers as are known in the art. However, between each two interconnecting segments, the conductive layers split up into two paths and merge again into the next interconnecting segment, thereby building a cavity in between them, which is accessible by air. The spatial structures between the interconnecting segments formed in this way comprise at least two side walls but can also comprise more than two side walls. For example, the spatial structures can build a rectangular or square shape which is open to the sides of the busbar, when the busbar is viewed from the sides. The spatial structures may, for example, also have a triangular or curved shape, such as in a corrugated sheet metal. However, these are merely example shapes and other structures are conceivable, too. In other words, the spatial structures split up the conductive layers into two deformed layers which are joint together before the next interconnecting segment and the spatial structures build air paths through the corresponding conductive layer transverse to the longitudinal direction of the busbar. Therefore, the spatial structures within the conductive layers provide at least some transverse (to the longitudinal direction) extending components of the conductive layers. The insulating layers arranged in between two conductive layers follow the same path as the adjacent conductive layers.

Because of the different coefficients of thermal expansion of the insulating layers and the conductive layers described above, when the busbar experiences a temperature increase, the insulating layers expand differently than the conductive layers, leading to a deformation of the sandwich-like structure. Because of this effect, the side walls of the spatial structures deform in such a way as to work against an overall elongation of the busbar. In particular, the side walls can be bend inwards towards the cavity within the corresponding structure, thereby contracting the interconnecting segments between the spatial structures towards the center of the cavity and introducing a shortening of the busbar. In other words, a temperature increase in the busbar leads to a contraction of the longitudinal dimension of the spatial structures within the conductive layers, which in turn also leads to a contraction of the busbar in the longitudinal direction. Although the interconnecting segments will also expand under a temperature increase, this expansion can be compensated by the shortening of the busbar resulting from the deformation of the spatial structures within the conductive layers.

According to an embodiment, each of the cavities extend along a transverse direction perpendicular to the longitudinal direction.

According to a further embodiment, each of the cavities allows air to flow through the cavities, thereby cooling the busbar.

The cavities are open at the lateral surfaces of the busbar, allowing air flow therethrough in a direction transverse to the longitudinal direction of the busbar. Because air is allowed to flow through the conductive layers, the busbar can be cooled utilizing the cavities as cooling channels. For example, forced air convection through the cavities may facilitate heat dissipation into the environment, thereby cooling the busbar. Such convection may, for example, be created by ventilators or other suitable techniques. However, even without any forced air convection, heat dissipation into the environment is facilitated. This integrated cooling functionality further reduces heating up of the busbar and therefore also reduces thermal elongation.

According to a further embodiment, each of the conductive layers is formed from two sublayers that are interconnected to one another to build the corresponding conductive layer. Each of the sublayers comprises recesses and protrusions that are located at regular or irregular distances to each other. One of the sublayers is the negative form of the other sublayer. The recesses of one of the sublayers together with the protrusions of the other sublayer build the spatial structures.

Such a layup allows for easy and cost-efficient manufacturing of the busbar. The sublayers may, for example, be plate metal sheets into which the corresponding parts of the spatial structures have been embossed or pressed. However, other structures are also conceivable. The sublayers may, for example, also be produced using preforms with electrically conducting fibers which are preimpregnated with a resin, brought into shape, and cured, to build the corresponding sublayers.

The term "recesses" as used herein, means indentations of the corresponding sublayer from the center or joining line of the sublayers, i.e., from the center line of the corresponding full conductive layer, towards one side of the sublayer. The term "protrusions" as used herein, means an elevation from this joining line of the sublayers towards the opposite side of the sublayer. The meaning of these terms will become clear with regard to the detailed description below in conjunction with the figures.

The two sublayers of each of the conductive layers may be joined by any suitable method known in the art.

According to a further embodiment, the spatial structures of each two adjacent conductive layers are offset against each other in the longitudinal direction.

Such an arrangement provides a compact design of the busbar. In particular, only the spatial structures of every second conductive layer are placed above each other. The spatial structures of the immediately adjacent (in the height direction of the busbar) conductive layer are placed in the space below or above the interconnecting segments of the next conductive layers.

According to a further embodiment, each of the conductive layers is configured to be connected to corresponding conductive layers of a second busbar at a first end and/or at a second end of the busbar.

In particular, connection sections of the conductive layers may protrude beyond the insulating layers at a first longitudinal end and at a second longitudinal end of the busbar, so as to be accessible to be connected to corresponding connection sections of a second busbar. The connection sections of the conductive layers of two busbars may be connected by any suitable technique, such as by clamps, by welding, by soldering or by other technique. In particular, two busbars may be connected by an approach allowing for slight displacement of the busbars, so as to meet precision requirements and to compensate manufacturing inaccuracies.

According to a further embodiment, the electrically insulating material comprises a plastics material.

However, any suitable non-conductive material may be used for the insulating layers. The material of the insulating layer has a different coefficient of thermal expansion than the conductive layers. For example, the insulating layers may be formed from a single plastics material or from a composition of different plastics materials. It is also conceivable that the insulating layers are made from a resin that is cured or from resin-preimpregnated plastics fibers that are cured.

According to a further embodiment, the electrically conductive material comprises copper and/or aluminum.

However, any other electrically conductive material is also possible. In particular, alloys of different metals are also conceivable. Also, the conductive layers could be made from Prepregs with electrically conducting fibers, as described above.

According to a further embodiment, the busbar comprises at least one connection area between a first end and a second end of the busbar at which each of the conductive layers can be contacted in an electrically conductive way.

Such connection areas may allow to connect electrical distribution boxes (EDBs) with a busbar. The cavities in the conductive layers further facilitate such connection of EDBs with the busbar, since the EDBs can be connected to the busbar from within the cavities.

According to a further embodiment, at least some of the conductive layers are designed for the transmission of digital data.

Thereby, some of the conductive layers may be designed to be exclusively used as data transmission lines. But some or all of the conductive layers may also be used to modulate digital data signals onto a voltage signal or high voltage signal on the corresponding conductive layer. For example, data signals could be modulated onto such signals, or applied to distinct data lines which are only used for data transmission, via EDBs connected to the busbar. For example, two electronic devices could be connected to different EDBs connected to the same busbar or busbar arrangement and could use the busbar to exchange digital data and communicate with each other.

According to a further embodiment, the conductive layers designed for the transmission of digital data are further designed to simultaneously serve as high voltage supply lines.

In this embodiment, digital data signals can be communicated via the same lines used for the supply of power to electrical consumers. The data signals can be modulated onto the power signal using known techniques in the art. It is also possible that a device is supplied with electrical power and can communicate with other devices via the same conductive layers of the busbar.

According to a further aspect, an aircraft is provided. The aircraft comprises at least one busbar as described above, at least one power source connected to the busbar, and at least one electrical load connected to the busbar. Electrical energy from the at least one power source is distributed to the at least one electrical load over the busbar.

According to an embodiment, the aircraft further comprises at least two electronic devices. The at least two electronic devices are connected to corresponding lines of the busbar and are in digital communication with each other via the busbar.

The two electronic devices can exchange digital data via dedicated data lines in the busbar or via a modulated signal onto a power signal on one or more of the conductive layers of the busbar.

According to a further aspect, a method of manufacturing a busbar is disclosed. The method starts with providing at least four metal plates comprising an electrically conductive material and providing at least three insulating layers comprising an electrically insulating material. The method proceeds with embossing a first one of the four metal plates with a first half of the spatial structures of the first conductive layer to form a first sublayer and with embossing a second one of the four metal plates with a second half of the spatial structures of the first conductive layer, forming the negative of the first half, to form a second sublayer. Next, the method comprises embossing a third one of the four metal plates with a first half of the spatial structures of the second conductive layer to form a third sublayer and embossing a fourth one of the four metal plates with a second half of the spatial structures of the second conductive layer, forming the negative of the first half, to form a fourth sublayer. In the next step, joining the first sublayer and the second sublayer to form the first conductive layer and joining the third sublayer and the fourth sublayer to form the second conductive layer takes place. In the next step, stacking the three insulating layers alternatingly with the first conductive layer and the second conductive layer, such that two of the three insulating layers build outer surfaces of the busbar takes place. Finally, the stacked insulating layers and conductive layers are joint to build the busbar.

The spatial structures of the first conductive layer and the second conductive layer as well as the materials of the conductive layers and the insulating layers can be designed according to any of the above described embodiments of the busbar. Embossing of the sublayers can, for example, be achieved by placing the metal sheets in an accordingly shaped pressing tool. Further, the sublayers of the first conductive layer and the second conductive layer can be embossed in the same pressing tool. For example, in embodiments of the busbar, where the spatial structures of the first conductive layer and the second conductive layer are offset against each other in the longitudinal direction, the pressing tool could be provided with a larger dimension than the longitudinal extension of the conductive layers and the layers can be cut accordingly after the embossing procedure.

Joining of the sublayers to form the corresponding conductive layer and joining of the conductive layers and the insulating layers to form the busbar can be achieved by any suitable joining process such as thermal joining methods (welding, brazing, soldering, etc.) or mechanical joining methods, as will be readily apparent for a person having ordinary skill in the art. Adhesive joints or any other suitable processes are also conceivable.

Also, although the above method steps have been described as happening in consecutive order, at least some or all of the steps can also take place simultaneously.

In summary, the disclosure herein provides a busbar that avoids or reduces mechanical tensions and mechanical stress within the layers of the busbar by avoiding or reducing a thermal elongation of the busbar. Thermal elongation is reduced by allowing the internal structure of the busbar do deform in such a way as to work against a thermal elongation, without deforming the general structure of the busbar. Spatial structures within the layers of the busbar provide for this functionality and simultaneously serve as a way for cooling. The provided busbar is versatile in that the number of conductive layers, i.e., conductors of the busbar, can easily be adjusted to the desired design requirements. The disclosed aircraft with such busbar or busbar arrangement allow for easy maintenance because complicated joining structures for the busbar segments are not necessary anymore, facilitating replacement of defective busbars within the aircraft. Further, the disclosed manufacturing method provides for uncomplicated and cost-efficient production of the busbar.

BRIEF DESCRIPTION OF THE DRAWINGS

In the following, example embodiments are described in more detail having regard to the attached figures. The illustrations are schematic and not to scale. Identical reference signs refer to identical or similar elements. The figures show.

DETAILED DESCRIPTION

Figure 1:
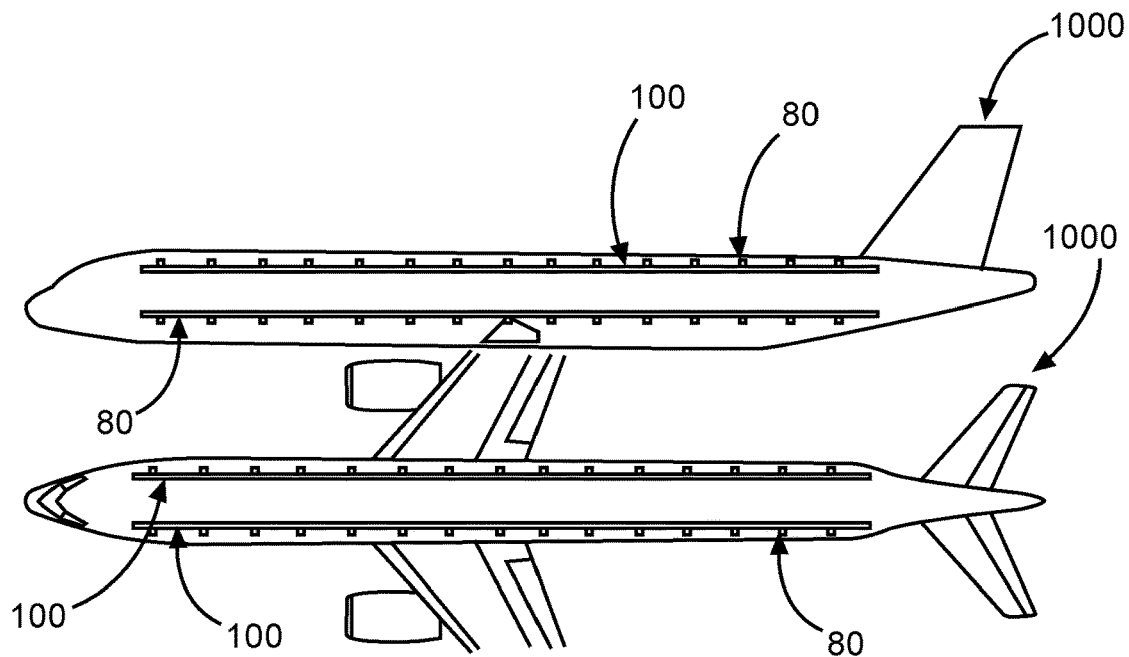
FIG. 1 A schematic view of an aircraft comprising four busbars according to an example embodiment.

FIG. 1 shows a schematic representation of an aircraft 1000 in a side view and in a top view according to an example embodiment. The aircraft 1000 includes four busbars 100, each running along the entire length of the aircraft 1000. The busbars 100 run in a bottom part and in a top part of the aircraft 1000, in each case on the left side and on the right side of aircraft 1000. Each of the busbars 100 comprises several electric distribution boxes (EDBs) 80 which can be used to connect electric and electronic equipment to the respective busbar 100. For example, each of the busbars 100 can be used to supply equipment with electrical energy or to allow electronics to communicate with each other using corresponding lines of the busbar 100 for data transmission. However, such digital communication may also take place via the same lines of the busbar that are used for supplying electrical energy, e.g., by modulating the digital signal onto the power signal.

Figure 2:
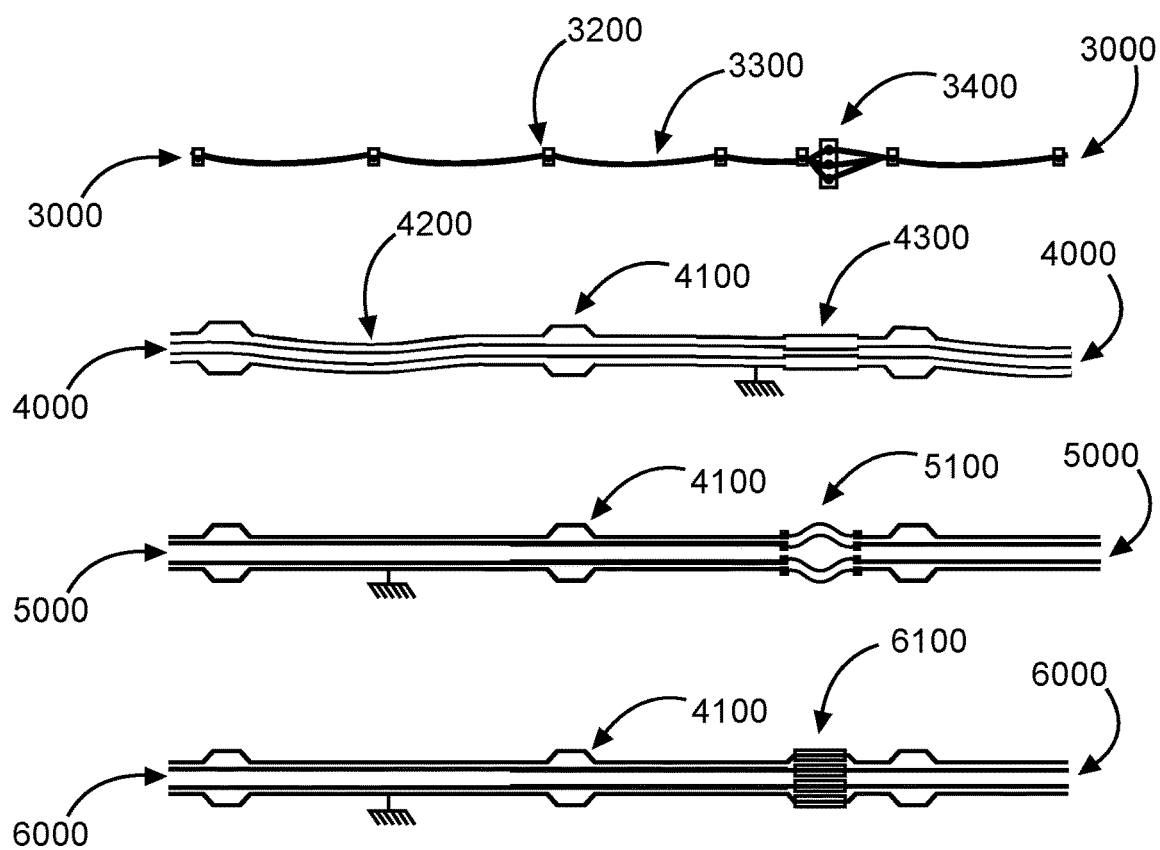
FIG. 2 A schematic overview of different state of art implementations of currently used busbars.

FIG. 2 is an overview of currently available state of the art busbars for aircrafts, or rather energy distributors in general. On top of FIG. 2, an arrangement of two flexible cables 3000 is shown. The two flexible cables 3000 are connected to each other by a cable junction 3400, which can be a standard cable clamp or any other connection device for cables. The flexible cable 3000 is mounted on a wall by several retainers 3200, which are necessary to fulfill distance requirements. Though such flexible cables 3000 are good in avoiding mechanical stress, such cables are, however, not very suitable as power distribution for aircrafts, because the retainers 3200 significantly increase the weight of the aircraft.

Below the flexible cables 3000 in FIG. 2, an arrangement of two flexible busbars 4000, comprising a rigid busbar area and a flexible busbar area 4200 is shown. The two flexible busbars 4000 are interconnected by a rigid junction 4300, which does not allow displacement of the two flexible busbars 4000 with respect to each other. However, the flexible busbar area 4200 allows each of the busbars 4000 to deform or buckle in case of thermal elongation because of a temperature increase. Although this allows to reduce mechanical stress, heat dissipation into the environment is limited, leading to further temperature increases at high electrical loads, which in turn can introduce further mechanical stress into the busbar.

Below the flexible busbars 4000, an arrangement of two rigid busbars 5000 which are connected by a flexible junction 5100 is illustrated. The flexible junction 5100 allow for displacement of the two rigid busbars 5000 if the busbars 5000 experience a thermal elongation. In this case, the flexible junction 5100 can deform. Such an arrangement also has the drawback, that heat dissipation is limited. Further, electrical isolation of the flexible junction 5100 is difficult.

At the bottom of FIG. 2, an arrangement of two rigid busbars 6000 connected by a sliding junction 6100 is shown. The sliding junction 6100 allows for displacement of the rigid busbars with respect to one another, in case one or both busbars 6000 experience thermal elongation. However, heat dissipation is also limited and the sliding junction 6100 is not suitable to be used for high voltage applications, since the occurring heating in the junction welds the rigid busbars 6000 and the sliding junction 6100 together, so that no displacement of them is possible anymore.

Figure 3:
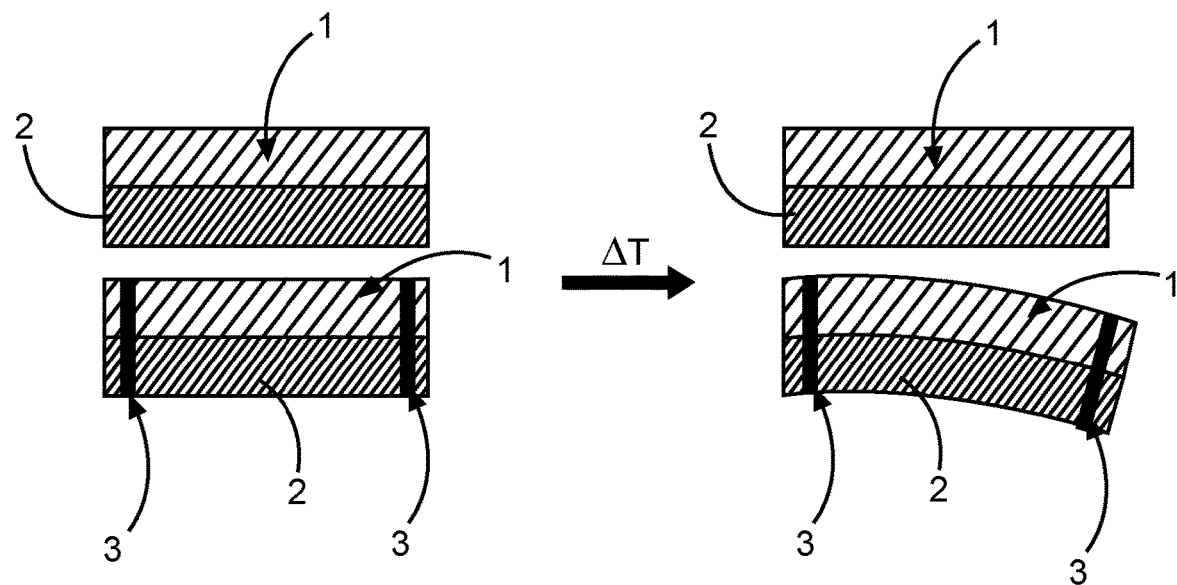
FIG. 3 A schematic view of the thermal effect utilized in the disclosure herein to avoid thermal elongation of a busbar.

FIG. 3 shows the general technical principle utilized in the disclosure herein to overcome the above problems. The left side of FIG. 3 shows an arrangement of a first layer 1 and a second layer 2 in two configurations at a first temperature. The two layers 1, 2 have different coefficients of thermal expansion, meaning under heat one of them expands more than the other one. At the top of the left side, the two layers 1, 2 are simply stacked up without any transverse interconnection between them. At the bottom of the left side, the two layers 1, 2 are stacked up and transversely interconnected with each other by two fixed connectors 3. The right side of FIG. 3 shows the same configurations after a temperature increase ΔT. On the bottom of the right side, because of the different coefficients of thermal expansion, the first layer 1 has increased more in length than the second layer. But because the two layers 1, 2 are not fixedly connected to each other, no bending occurs but the first layer 1 just gets longer than the second layer 2. However, on the bottom of the right side of FIG. 3, the first layer 1 and der second layer 2 are interconnected by the fixed connectors 3. Hence, the first layer 1, which expands more under heat, is hindered in expanding away from the second layer 2. But since it still expands more than the second layer 2, the whole arrangement of the two layers deforms and is bend downwards.

For the effect to work, the two materials have different coefficients of thermal expansion. It is not necessary for both materials to be metals. The busbar 100 described below with reference to FIGS. 4 to 6 utilizes this effect with an electrically conductive material, for example a metal material, and with an insulating material, for example a plastics material, in a sophisticated way to provide a busbar 100 that does not experience an overall thermal elongation under heat.

Figure 4:
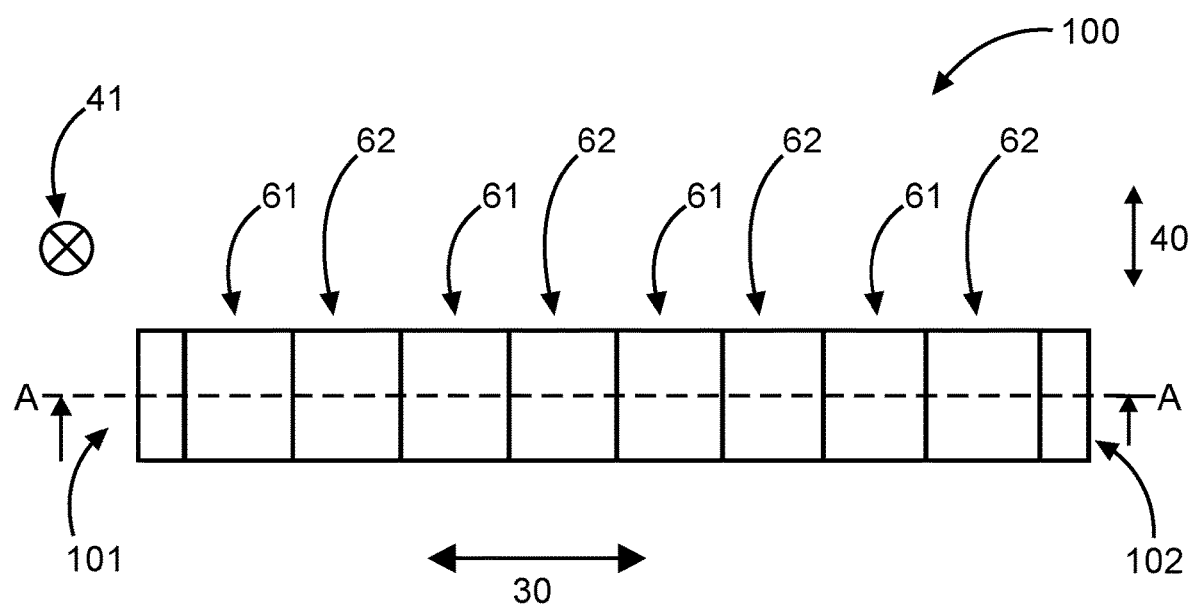
FIG. 4 A schematic top view of a busbar according to an example embodiment.
Figure 5:
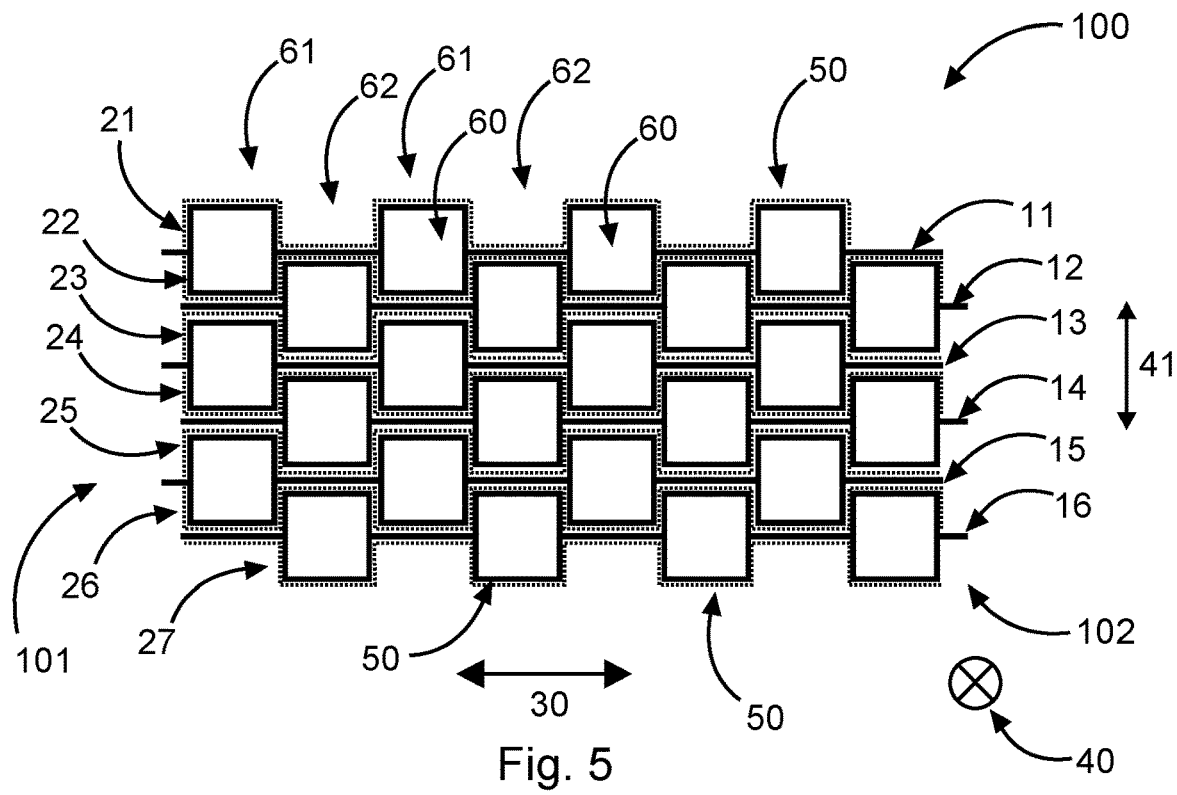
FIG. 5 A schematic sectional view of the busbar of FIG. 4 along cut line A-A according to an example embodiment.

With reference to FIGS. 4 and 5, an example embodiment of a busbar 100 according to the present disclosure is described. FIG. 4 shows the busbar 100 in a schematic top view. FIG. 5 shows a schematic sectional view of the busbar 100 of FIG. 4 along cut line A-A. The illustrated busbar 100 comprises six conductive layers 11-16 and seven insulating layers 21-27 which are arranged alternatingly in a height direction 41. Insulating layers 21 and 27 build outer surfaces 50, i.e., top and bottom surfaces of the busbar 100. The conductive layers 11-16 act as conducting lines of the busbar 100. For example, high voltage DC or AC power can be distributed via the conductive layers 11-16 from one or more power sources, such as power generators or batteries, to a plurality of electrical consumers distributed over an aircraft. Further, the conductive layers 11-16 can be used to transmit digital data signals between different electronic devices connected to the busbar 100.

The conductive layers 11-16 are extending in a longitudinal direction 30 and in a transverse direction 40 of the busbar 100. The longitudinal direction 30 corresponds to the general extension direction of the busbar, i.e., the direction along the aircraft 1000 in FIG. 1 in which current and data signals can be conducted.

Each of the conductive layers 11-16 comprises interconnecting segments 62 and spatial structures 61. The spatial structures 61 are arranged alternatingly in the longitudinal direction 30 with the interconnecting segments 62, meaning each two adjacent (in the longitudinal direction 30) spatial structures 61 are connected by an interconnecting segment 62 at same or different distances between each other. The spatial structures 61 and the interconnecting segments 62 of each two adjacent (in the height direction 41) conductive layers 11-16 are shifted with respect to each other in the longitudinal direction 30, so that below a corresponding spatial structure 61 of one of the conductive layers 11-16 an interconnecting segment of the next conductive layer 11-16 is arranged and vice versa. At the interface between a first (left) interconnecting segment 62 and a spatial structure 61, the corresponding conductive layer 11-16 splits up into two paths and merges again at the interface between the corresponding spatial structure 61 and the next (right) interconnecting segment 62. By this arrangement, a cavity 60 is formed within each of the spatial structures 61. These cavities 60 extend in a transverse direction 40 of the busbar 100, which is perpendicular to the longitudinal direction 30 or length direction. Air can flow through the cavities 60, facilitating heat dissipation into the environment once the busbar 100 heats up, e.g., by the current flowing through the conductive layers 11-16.

Although in the embodiment shown in FIGS. 4 and 5, the busbar 100 comprises six conductive layers 11-16, it is readily apparent that any suitable number of conductive layers can be used in accordance with the design requirements of the corresponding application scenario. Further, although the spatial structures 61 are shown as having a rectangular shape in FIGS. 4 and 5, the spatial structures 61 may also have curved shapes, such as in a corrugated sheet metal. In such embodiments, the spatial structures 61 and the interconnecting segments 62 of the conductive layers 11-14 may continuously merge into each other.

The conductive layers 11-16 comprise an electrically conductive material or are entirely made of such material and the insulating layers 21-27 comprise an electrically insulating material or are entirely made of such material. The electrically conductive material and the electrically insulating material comprise different coefficients of thermal expansion, leading to different length changes when the busbar 100 experiences a rise in temperature.

The insulating layers 21-27 are arranged between the conductive layers 11-16 and are fixedly connected, for example glued, to the conductive layers 11-16. Their shape corresponds to the shape of the immediately adjacent conductive layers 11-16.

This arrangement and design of the conductive layers 11-16 and the insulating layers 21-27 utilizes the effect described with reference to FIG. 3 to avoid or reduce an elongation of the busbar 100 in the longitudinal direction 30, as will be described below with reference to FIG. 6. Further, at the ends 101, 102 of the busbar 100, the conductive layers 11-16 can be connected to corresponding conductive layers 11-16 of a second busbar 100. In this way, it is possible to build a very long busbar 100, comprising a plurality or busbar segments. For example, such a busbar 100 may cover the full aircraft length, e.g., 23 meters. Further, connection elements to connect two of the described busbars 100 may be simplified because a smaller displacement of the single busbars 100 with respect to one another is achieved. Flexible junctions between two bus bars are not necessary anymore. The included cooling functionality further reduces the thermal elongation of the busbar 100. The busbar 100 compensates for thermal expansion effects by thermal expansion of internal structures while the shape of the busbar as such remains almost the same. The spatial structures compensate thermal expansion, and the length of the busbar does not substantially vary.

Figure 6:
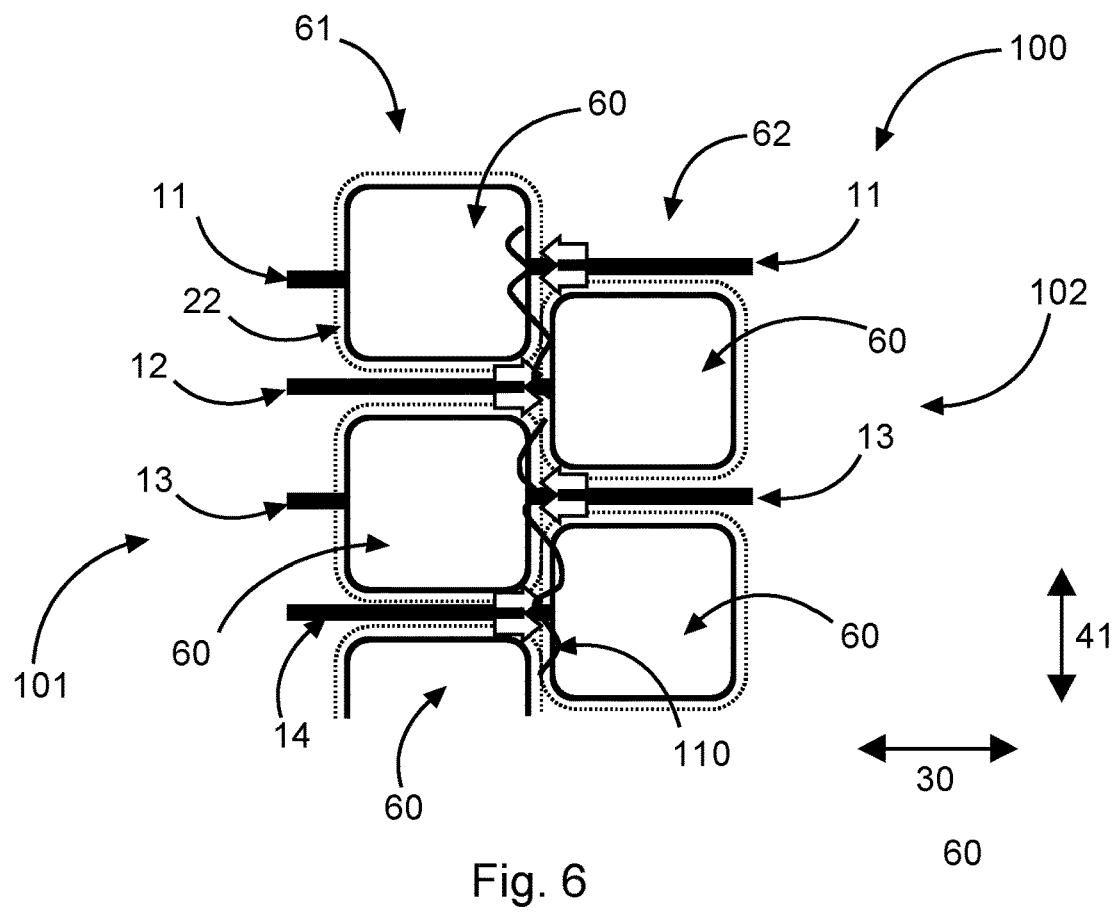
FIG. 6 A detailed view illustrating the effect of FIG. 3 as utilized in an example embodiment.

FIG. 6 shows a portion of the busbar 100 of FIG. 5 and illustrates the principle according to which the busbar 100 of FIGS. 4 and 5 avoids thermal elongation when the busbar 100 experiences an increase in temperature. As described above, the materials of the insulating layers 21-27 and of the conductive layers 11-16 comprise different coefficients of thermal expansion, meaning under a temperature change, these materials expand to a different extent. Since the insulating layers 21-27 and the conductive layers 11-16 are fixedly connected to each other, they cannot expand away from each other. Further, because of the alternating arrangement of spatial structures 61 and interconnecting segments 62, the insulating layers 21-17 and the conductive layers 11-16 are not only flatly extending but are each extending in two directions, namely in the longitudinal direction 30 and in the height direction 41. Therefore, when the busbar 100 heats up, the material of the corresponding conductive layer and of the corresponding insulating layer in the side walls of each spatial structure 61 expands differently and thereby deforms the side walls by the effect described with reference to FIG. 3. When this happens, the side walls of the spatial structures 61 are bent according to the illustrated line showing the deformation 110. In other words, the side walls of each spatial structure 61 get bent inwards towards the corresponding cavity 60.

In the initial state, before the busbar 100 heats up, for example due to the electric current flowing through the busbar 100, the interconnecting segments 62 are extending from the spatial structures 61 in the longitudinal direction 30. Thermal expansion of the busbar is compensated by deforming of the side walls of the spatial structures 61. Therefore, when the side walls of each spatial structure are deformed in the described way, the interconnecting segments 62 are contracted towards the cavity 60, thereby introducing a negative elongation, i.e., shortening the busbar 100, and working against a thermal expansion of the whole busbar 100. Further, the cavities 60 allow to better dissipate heat energy into the environment, thereby cooling the busbar 100. In other words, the busbar 100 is allowed to deform in the height direction 41, which deformation works against an elongation of the busbar 100 as a whole.

Figure 7:
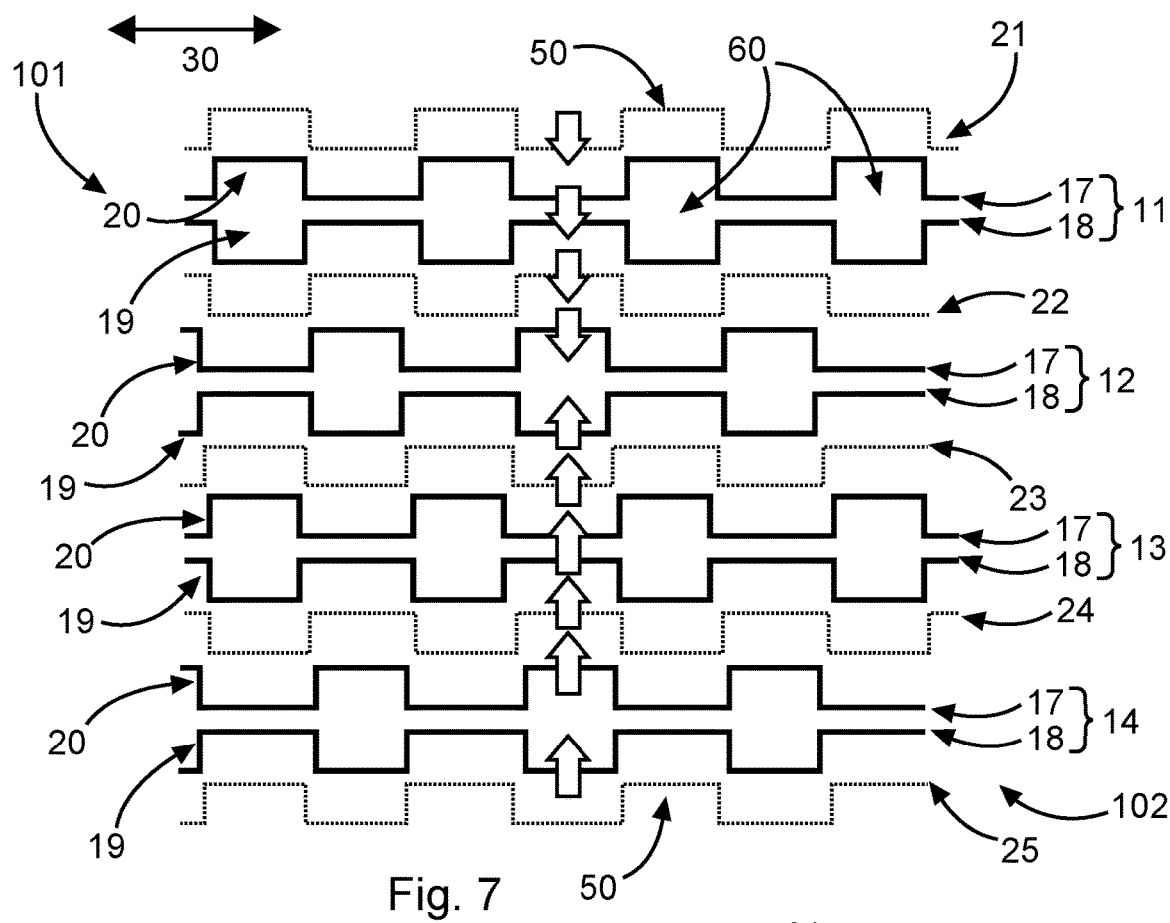
FIG. 7 A schematic exploded sectional view of the busbar of FIG. 4 according to an example embodiment.

FIG. 7 shows an exploded view of the busbar 100 of FIGS. 4 and 5 according to an example embodiment. The busbar 100 shown in FIG. 7 comprises four conductive layers 11-15. In particular, it is illustrated how the insulating layers 21-25 and the conductive layers 11-14 are stacked up. In FIG. 7, each of the conductive layers 11-14 is formed from two sublayers 17, 18 which together form the corresponding conductive layer having spatial structures 61 and interconnecting segments 62. Thereby, one of the two sublayers 17, 18 is the negative form of the other of the two sublayers 17, 18. Each of the sublayers 17, 18 comprises alternatingly in the longitudinal direction 30 recesses 19 and protrusions 20. Thereby, the term "recesses" as used herein, means indentations of the corresponding sublayer 17, 18 from the center or joining line of the sublayers 17, 18, i.e., from the center line of the corresponding full conductive layer 11-14, towards the bottom of the figure. The term "protrusions" as used herein, means an elevation from this joining line of the sublayers 17, 18 towards the top of the figure. For example, the recesses 19 and protrusions 20 may be a structure embossed or pressed in a sheet metal plate.

The insulating layers 21-25 are placed in between the full conductive layers 11-14 and on top of the first conductive layer 11 and on the bottom of the last conductive layer 25. The insulating layers 21 and 25 build outer surfaces 50 of the busbar 100. The shape of the insulating layers 21-25 corresponds to the respective shapes of the immediately adjacent conductive layers 11-14. The insulating layers 21-25 may be made from a flexible or from a solid plastics material or any other suitable material to electrically isolate the single conductive layers 11-14 from one another. For example, the insulating layers 21-25 may also be made from a resin that is applied on the conductive layers 11-14 and afterwards cured during manufacturing. The conductive layers 11-14, or the corresponding sublayers 17, 18, respectively, may be made from any suitable electrically conductive material, such as copper or aluminum.

By stacking up the sublayers 17, 18 to form the conductive layers 11-14 and the conductive layers 11-14 and the insulating layers 21-25 to form the busbar 100, a busbar structure as described with reference to FIGS. 4 and 5 is build. This structure also allows for easy and cost-efficient manufacturing of such busbar 100.

Figure 8:
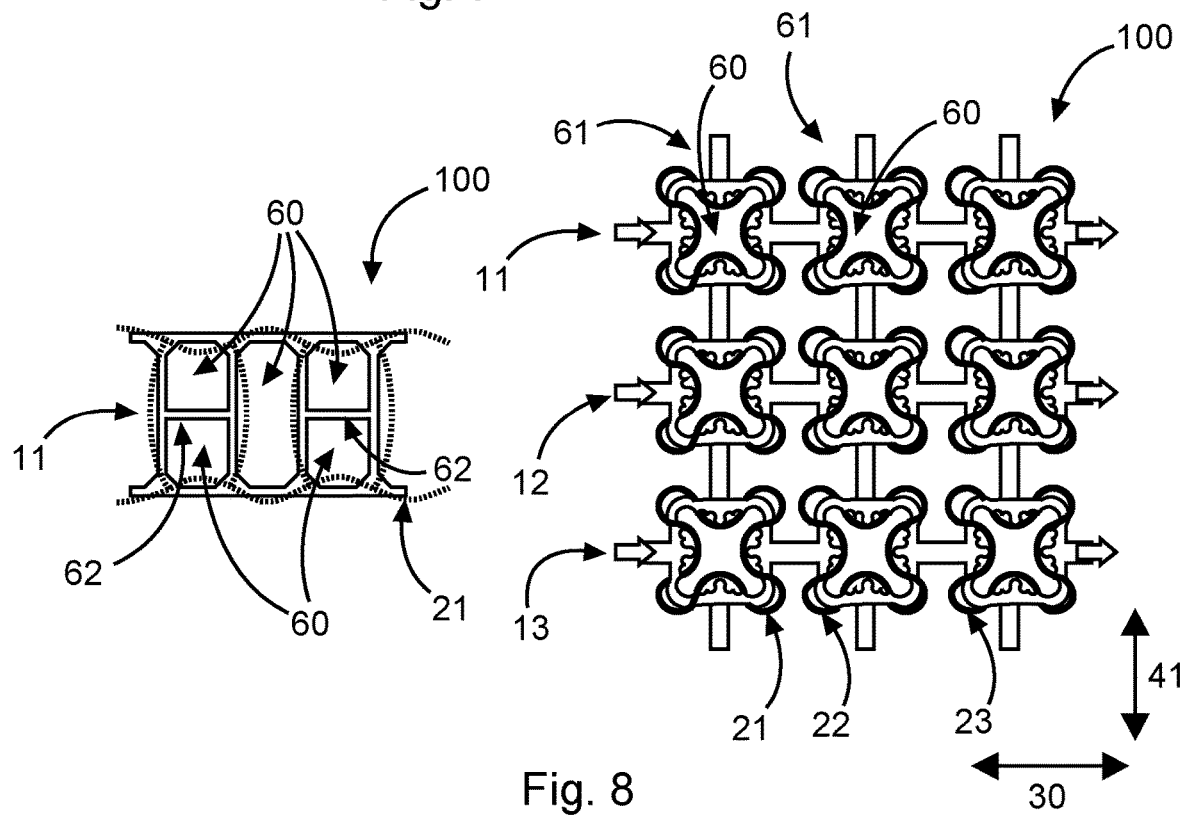
FIG. 8 A schematic sectional view of busbars according to further example embodiments.

FIG. 8 shows two busbars 100 according to alternative example embodiments. On the left side, a similar arrangement as described with reference to FIGS. 4 and 5 is shown, but only one conductive layer 11 is illustrated. However, in this arrangement, every second cavity 60 is connected by an interconnecting segment 62.

On the right side of FIG. 8, the conductive layers 11-13 and the insulating layers are arranged in a grid-like structure. The conductive layers 11-13 extend in the longitudinal direction of the busbar 100. The insulating layers extend in the height direction 41 and surround the spatial structures 61 with the cavities 60.

The working principle of these embodiments is the same as for the embodiment described with reference to FIGS. 4 and 5, as will become immediately apparent for a person having ordinary skill in the art and will therefore not be repeated here. The difference between the described embodiments is the shape and structure of the conductive layers.

Figure 9:
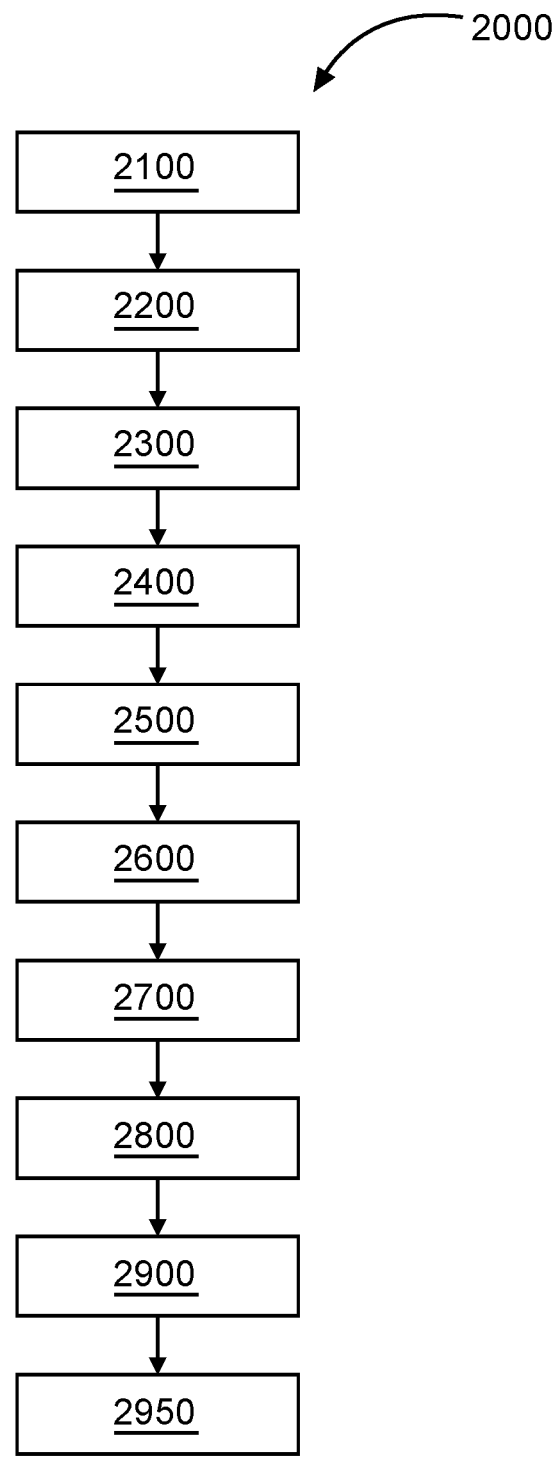
FIG. 9 A flowchart of a method of manufacturing a busbar according to an example embodiment.

FIG. 9 is a flow chart of a method 2000 of manufacturing a busbar 100 according to an example embodiment. The method starts with providing 2100 at least for metal plates comprising an electrically conductive material. In general, the busbar 100 comprises twice as much metal plates than conductive layers 11, i.e., four metal plates for two conductive layers 11-12, six metal plates for three conductive layers 11-13, etc. This is because each conductive layer 11 is built from two sublayers 17, 18.

In step 2200, the method comprises providing at least three insulating layers 21-23 comprising an electrically insulating material. In general, one insulating layer 21 more than conductive layers 11 in the finished busbar 100 needs to be provided.

In steps 2300-2600, the four metal plates will be embossed. Each of the four metal plates will build one of the sublayers 17, 18 of the conductive layers 11, 12. In general, for each conductive layer 11, 12, one metal plate will be embossed with one half form of the spatial structure in the conductive layer 11, 12 using a pressing tool. Another corresponding plate will be embossed with the negative form of the first sublayer 17 of the corresponding conductive layer 11, 12. The sublayers 17, 18 can for example be formed like the sublayers shown in FIG. 7. Instead of embossing the metal plates, it is also conceivable to produce them by a preform with electrically conducting fibers, that are infiltrated with a resin and cured. Although shown in FIG. 9 as consecutive steps, the steps 2300-2600 can also take place simultaneously.

After embossing the four metal plates, in steps 2700 and 2800, two corresponding ones of the four embossed metal plates/sublayers 17, 18 will be joint together, to form the corresponding conductive layer 11, 12. Joining of the sublayers 17, 18 can be done by any known and suitable process, e.g., by thermal or mechanical joining processes.

In step 2900, the conductive layers 11, 12 and the insulating layers 21-23 are stacked upon each other in an alternating way, so that after each insulating layer, a conductive layer follows and vice versa. Thereby, two of the insulating layers 21-23 form outer surfaces 50 of the busbar 100. In other words, the first and the last layer in the layup is always an insulating layer.

The method 2000 ends with joining the stacked insulating layers 21-23 and conductive layers 11, 12 together, e.g., by known thermal or mechanical joining processes.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 first layer
2 second layer
3 fixed connectors
11-16 conductive layers
17 first sublayer
18 second sublayer
19 recesses
20 protrusions
21-27 insulating layers
30 longitudinal direction
40 transverse direction
41 height direction
50 outer surfaces of the busbar
60 cavities
61 spatial structures
62 interconnecting segments
80 electrical distribution box
100 busbar
101 first end of the busbar
102 second end of the busbar
A-A cut line
110 deformation
200 power source
300 electrical load
400 electronic device
401 electronic device
1000 aircraft
2000 method
2100 providing of metal plates
2200 providing of insulating layers
2300 embossing a metal plate
2400 embossing a metal plate
2500 embossing a metal plate
2600 embossing a metal plate
2700 joining of sublayers
2800 joining of sublayers
2900 stacking the conductive layers and the insulating layers
2950 joining the conductive layers and the insulating layers
3000 flexible cable
3200 retainers
3300 cable
3400 cable junction
4000 flexible busbar
4100 electronic distribution box connection area
4200 flexible busbar area
4300 rigid junction
5000 rigid busbar with flexible junction
5100 flexible junction
6000 rigid busbar with sliding junction
6100 sliding junction

The invention claimed is:

1. A busbar, comprising:
at least two conductive layers;
at least three insulating layers;
the conductive layers comprising an electrically conductive material;
the insulating layers comprising an electrically insulating material; and
wherein the conductive layers and the insulating layers are stacked together alternatingly and are extending in a longitudinal direction, wherein outer surfaces of the busbar are formed by two of the insulating layers;
wherein the electrically insulating material and the electrically conductive material comprise different coefficients of thermal expansion;
wherein each of the conductive layers comprises a plurality of spatial structures, each of which comprises at least two side walls and at least partially surrounds a cavity, wherein each of the plurality of spatial structures is connected to an adjacent one of the plurality of spatial structures by an interconnecting segment;
wherein each of the conductive layers is embedded between two insulating layers, so that, due to thermal expansion of the busbar resulting from the different coefficients of thermal expansion, the insulating layers exert a force on the conductive layers, resulting in a deforming of the side walls of the spatial structures, thereby compensating a longitudinal expansion of the conductive layers.

2. The busbar of claim 1, wherein each of the cavities extends along a transverse direction perpendicular to the longitudinal direction.

3. The busbar of claim 1, wherein each of the cavities allows air to flow through the cavities, thereby cooling the busbar.

4. The busbar of claim 1, wherein each of the conductive layers is formed from two sublayers that are interconnected to one another to build the conductive layer;
wherein each of the sublayers comprises recesses and protrusions, wherein one of the sublayers is a negative form of the other sublayer; and
wherein the recesses of one of the sublayers together with the protrusions of the other sublayer build the spatial structures.

5. The busbar of claim 2, wherein the spatial structures of each two adjacent conductive layers are offset against each other in the longitudinal direction.

6. The busbar of claim 1, wherein each of the conductive layers is configured to be connected to corresponding conductive layers of a second busbar at a first end and/or at a second end of the busbar.

7. The busbar of claim 1, wherein the electrically insulating material comprises a plastics material.

8. The busbar of claim 1, wherein the electrically conductive material comprises copper and/or aluminum.

9. The busbar of claim 1, further comprising at least one connection area between a first end and a second end of the busbar at which each of the conductive layers can be contacted in an electrically conductive way.

10. The busbar of claim 1, wherein at least some of the conductive layers are configured for transmission of digital data.

11. The busbar of claim 10, wherein the conductive layers for the transmission of digital data are further configured to simultaneously serve as high voltage supply lines.

12. An aircraft, comprising:
at least one busbar according to claim 1;
at least one power source connected to the busbar; and
at least one electrical load connected to the busbar;

wherein electrical energy from the at least one power source is distributed to the at least one electrical load over the busbar.

13. The aircraft of claim 12, further comprising at least to electronic devices, wherein the two electronic devices are connected to corresponding lines of the busbar; and wherein the two electronic devices are in digital communication with each other via the busbar.

14. A method for manufacturing a busbar of claim 1, the method comprising:

providing at least four metal plates comprising an electrically conductive material;

providing at least three insulating layers comprising an electrically insulating material;

embossing a first one of the four metal plates with a first half of the spatial structures of the first conductive layer to form a first sublayer;

embossing a second one of the four metal plates with a second half of the spatial structures of the first conductive layer, forming a negative of the first half, to form a second sublayer;

embossing a third one of the four metal plates with a first half of the spatial structures of the second conductive layer to form a third sublayer;

embossing a fourth one of the four metal plates with a second half of the spatial structures of the second conductive layer, forming the negative of the first half, to form a fourth sublayer;

joining the first sublayer and the second sublayer to form the first conductive layer;

joining the third sublayer and the fourth sublayer to form the second conductive layer;

stacking the three insulating layers alternatingly with the first conductive layer and the second conductive layer, such that two of the three insulating layers build outer surfaces of the busbar; and joining the stacked insulating layers and conductive layers to build the busbar.

* * * * *